United States Patent
Perry et al.

(10) Patent No.: US 12,461,315 B2
(45) Date of Patent: Nov. 4, 2025

(54) COUPLING FIBER OPTIC STRANDS BY ALIGNING THE ENDS OF THE FIBER OPTIC STRANDS

(71) Applicant: AT&T INTELLECTUAL PROPERTY I, L.P., Atlanta, GA (US)

(72) Inventors: Ricky Perry, Cumming, GA (US); Julie Lorentzen, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 601 days.

(21) Appl. No.: 17/870,079

(22) Filed: Jul. 21, 2022

(65) Prior Publication Data
US 2024/0027690 A1    Jan. 25, 2024

(51) Int. Cl.
*G02B 6/38* (2006.01)
(52) U.S. Cl.
CPC .......... *G02B 6/3809* (2013.01); *G02B 6/389* (2013.01)
(58) Field of Classification Search
None
See application file for complete search history.

(56) References Cited

U.S. PATENT DOCUMENTS

| | | | | |
|---|---|---|---|---|
| 5,675,681 A | * | 10/1997 | Chiaretti | G02B 6/3874 385/59 |
| 5,963,699 A | * | 10/1999 | Tanaka | G02B 6/3806 385/83 |
| 6,634,795 B2 | * | 10/2003 | Pawluczyk | G02B 6/403 385/54 |
| 9,829,667 B2 | * | 11/2017 | White | G02B 6/3612 |
| 2002/0064350 A1 | * | 5/2002 | Pawluczyk | G02B 6/403 385/54 |
| 2004/0057672 A1 | * | 3/2004 | Doss | B24B 19/226 385/76 |
| 2006/0067636 A1 | * | 3/2006 | Bludau | G02B 6/4453 385/135 |
| 2012/0257860 A1 | * | 10/2012 | Li | G02B 6/3885 385/83 |
| 2018/0067262 A1 | * | 3/2018 | Larson | C09J 11/04 |
| 2019/0011640 A1 | * | 1/2019 | Cao | G02B 6/3846 |

* cited by examiner

*Primary Examiner* — Jerry Rahll
(74) *Attorney, Agent, or Firm* — Guntin & Gust, PLC; Mark Wilinski

(57) ABSTRACT

The technologies described herein are generally directed to the use of fiber optic cables for communication. For example, a method described herein can include moving opposing members of a fiber optic securing clip from an open position to a closed position, wherein the opposing members are spaced apart to receive a first fiber optic strand comprising a bare end. The method can further include, based on the opposing members being in the closed position, securing the bare end of the first fiber optic strand within the fiber optic securing clip comprising optically coupling the first fiber optic strand to an end of a second fiber optic strand.

20 Claims, 10 Drawing Sheets

700

702 — MOVING OPPOSING MEMBERS OF A FIBER OPTIC SECURING CLIP FROM AN OPEN POSITION TO A CLOSED POSITION, WHEREIN THE OPPOSING MEMBERS ARE SPACED APART TO RECEIVE A FIRST FIBER OPTIC STRAND COMPRISING A BARE END

704 — BASED ON THE OPPOSING MEMBERS BEING IN THE CLOSED POSITION, SECURING THE BARE END OF THE FIRST FIBER OPTIC STRAND WITHIN THE FIBER OPTIC SECURING CLIP COMPRISING OPTICALLY COUPLING THE FIRST FIBER OPTIC STRAND TO AN END OF A SECOND FIBER OPTIC STRAND

802 — RECEIVING A BARE END OF A FIRST FIBER OPTIC STRAND BY SECURING MEMBERS OF A FIBER OPTIC DIAGNOSTIC CLIP, RESULTING IN A RECEIVED FIRST FIBER OPTIC STRAND

804 — COMMUNICATING A LIGHT SIGNAL FROM THE FIRST FIBER OPTIC STRAND TO A SECOND FIBER OPTIC STRAND VIA AN OPTIC COUPLING OF THE FIRST FIBER OPTIC STRAND TO THE SECOND FIBER OPTIC STRAND, WHEREIN THE OPTIC COUPLING IS FACILITATED BY THE SECURING MEMBERS SECURING THE RECEIVED FIRST FIBER OPTIC STRAND WITHIN THE FIBER OPTIC DIAGNOSTIC CLIP, AS A RESULT OF WHICH THE BARE END OF THE FIRST FIBER OPTIC STRAND IS COMMUNICATIVELY ALIGNED WITH A COUPLING END OF THE SECOND FIBER OPTIC STRAND

FIG. 8

COUPLING FIBER OPTIC STRANDS BY ALIGNING THE ENDS OF THE FIBER OPTIC STRANDS

TECHNICAL FIELD

The subject application is related to different approaches to handling fiber optic strands and, for example, to providing connections to join fiber optic strands together.

BACKGROUND

As fiber optic deployments increase, the reasons for connections to fiber strands continues to increase. Reasons for connections to one or more fiber optic strands can vary in their requirements for permanence, and ease of setup and termination. Inefficiencies can occur when connection techniques are used to connect to fiber optic strands in a permanent way for applications when connections only need to be temporary, e.g., for testing fiber optic strands.

These inefficiencies can be aggravated when a raw end fiber optics strand is coupled to another strand for different applications. Often for a raw end of a fiber optic strand, even for temporary applications, durable connection approaches are used, such as splicing the raw end of the fiber optic strand to another fiber optic strand with a connector attached, e.g., for connecting to a testing device. Inefficiencies can result because some durable approaches require complex effort and materials be dedicated to forging strong connections (e.g., splicing) that are required for a relatively short period of time, with the spliced connectors needing to be cut off when done.

These problems can be aggravated when bundles of individual raw end fiber optic strands are all handled by durable approaches when only temporary coupling to the strands is required.

BRIEF DESCRIPTION OF THE DRAWINGS

The technology described herein is illustrated by way of example and not limited in the accompanying figures in which like reference numerals indicate similar elements and in which:

FIG. 7 illustrates an example method that can facilitate coupling fiber optic strands by aligning the ends of the fiber optic strands, in accordance with one or more embodiments.

FIG. 8 illustrates an example method that can facilitate coupling fiber optic strands by aligning the ends of the fiber optic strands, in accordance with one or more embodiments.

DETAILED DESCRIPTION

Generally speaking, one or more embodiments of a system described herein can facilitate coupling fiber optic strands by aligning the ends of the fiber optic strands, e.g., by a securing component that can provide a less permanent connection than other types of approaches. It should be understood that any of the examples and terms used herein are non-limiting.

One having skill in the relevant art(s), given the disclosure herein understands that the mechanical systems, computer processing systems, computer-implemented methods, equipment (apparatus) and/or computer program products described herein can employ devices, hardware and/or software to solve problems that are highly technical in nature (e.g., coupling fiber optic strands together), that are not abstract and cannot be performed as a set of mental acts by a human. For example, a human, or even a plurality of humans, cannot efficiently, and with a high level of precision, communicatively couple fiber optic strands together with the same or similar characteristics as one or more embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate coupling fiber optic strands by aligning the ends of the fiber optic strands. Different examples that describe these aspects are included with the description of FIGS. 1-10 below. It should be noted that the subject disclosure may be embodied in many different forms and should not be construed as limited to this example or other examples set forth herein.

Figure 1:
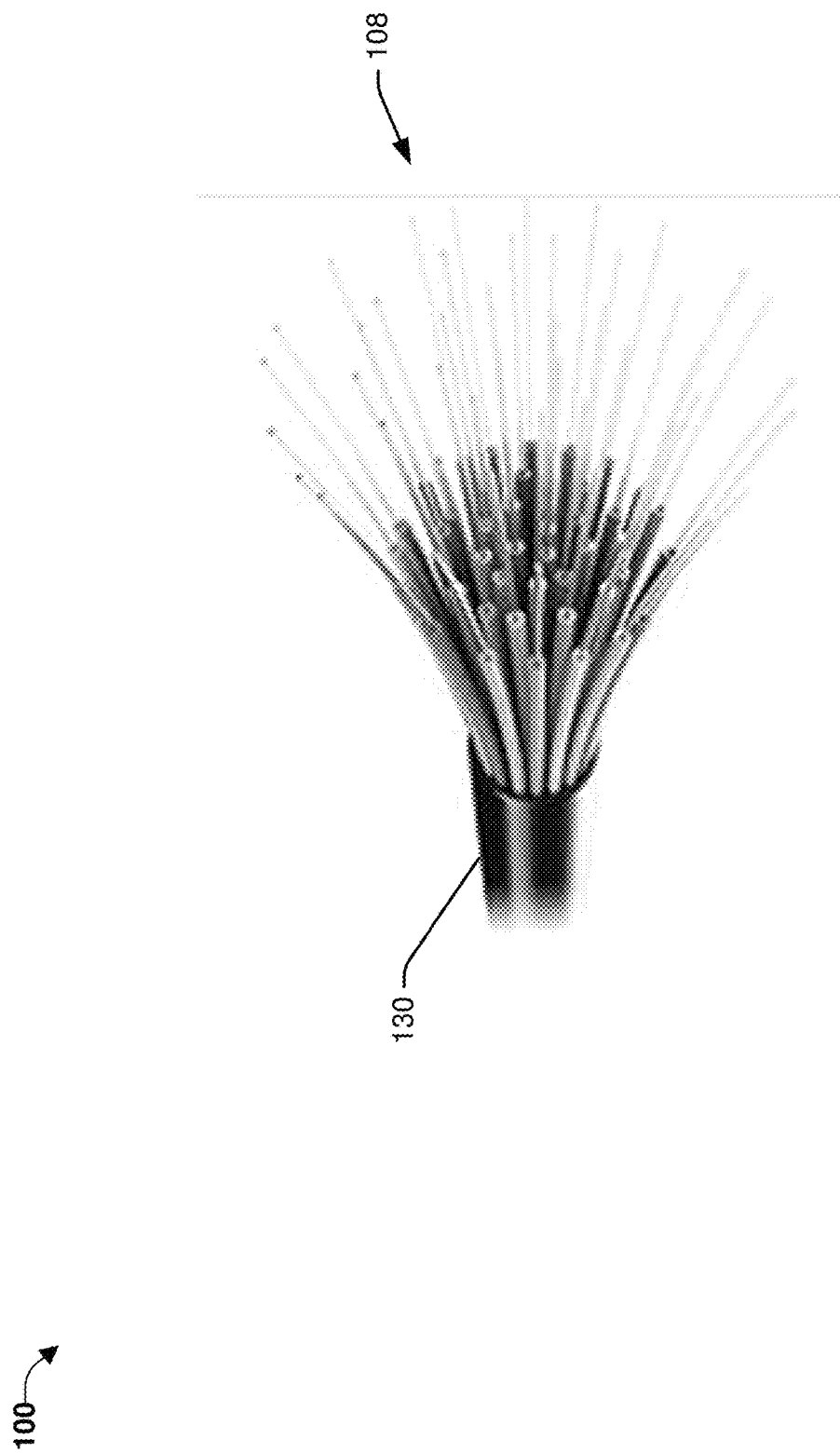
FIG. 1 is non-limiting example of a fiber optic implementation that can facilitate one or more embodiments described herein.
Figure 2:
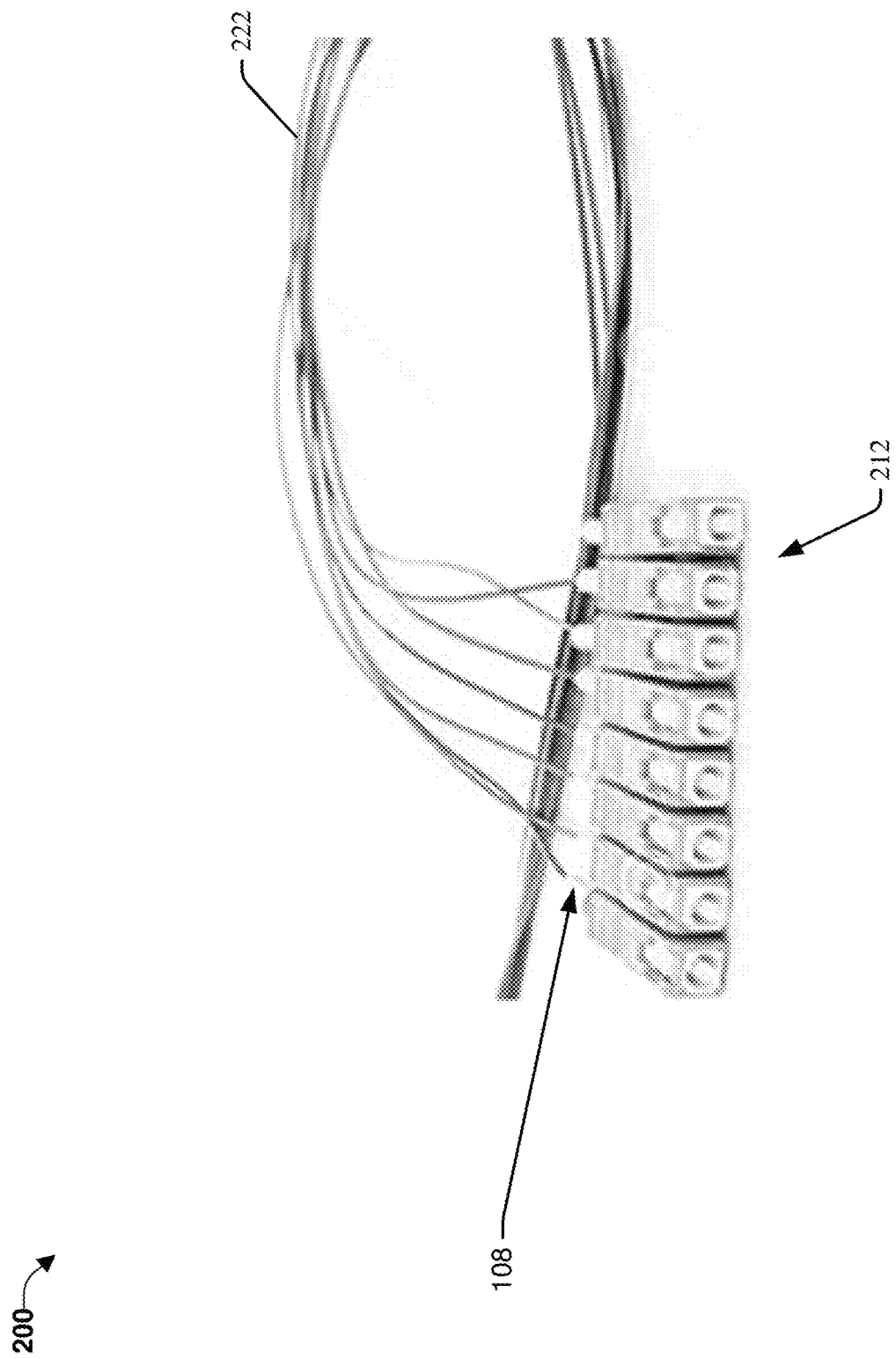
FIG. 2 is another non-limiting example of a fiber optic implementation that can facilitate one or more embodiments described herein.

FIGS. 1-2 are non-limiting examples of different fiber optic implementations 100 and 200 that can facilitate one or more approaches described herein. For purposes of brevity, description of some details described with different embodiments herein are omitted. FIG. 1 depicts multiple bare fiber optic strands 108 emerging from fiber optic cable 130 that holds the strands together for use.

As described further herein, one or more embodiments can be used to couple one or more bare fiber optic strands 108 to connectors in certain circumstances. It should be noted that the arrangement of fiber optic strands 108 in fiber optic cable 130 is not limiting, with different arrangements of one strand to many strands (e.g., as depicted in FIG. 3 discussed below) also being able to be handled by one or more embodiments described herein.

FIG. 2 depicts one approach that can be used to couple fiber optic strands 108 in fiber optic cable 130 to different destination devices. In an example use of the components of FIG. 2, fiber optic strands 108 may need to be temporarily connected to a destination device, e.g., for testing the operation of fiber optic strands 108. One approach used to facilitate this type of temporary connection can use approaches that can also be used for more permanent connections, e.g., fusion splicing respective connectors 212 to the ends of fiber optic strands 108, resulting in connectorized fiber optic strands.

In example approaches to this type of onsite (e.g., for testing at a deployment location) coupling, a fiber optics engineer can use a portable splicing workshop (e.g., 'splicing trailer') positioned at a site to splice connectors 212 to a raw ends of a fiber optics strand 108. Connectors 212 can then be used to connect to testing equipment for texting that may only take seconds to minutes to complete. Once completed, connectors 212 are often cut from fiber optic strands 108 to facilitate other types of connections being implemented.

Figure 3:
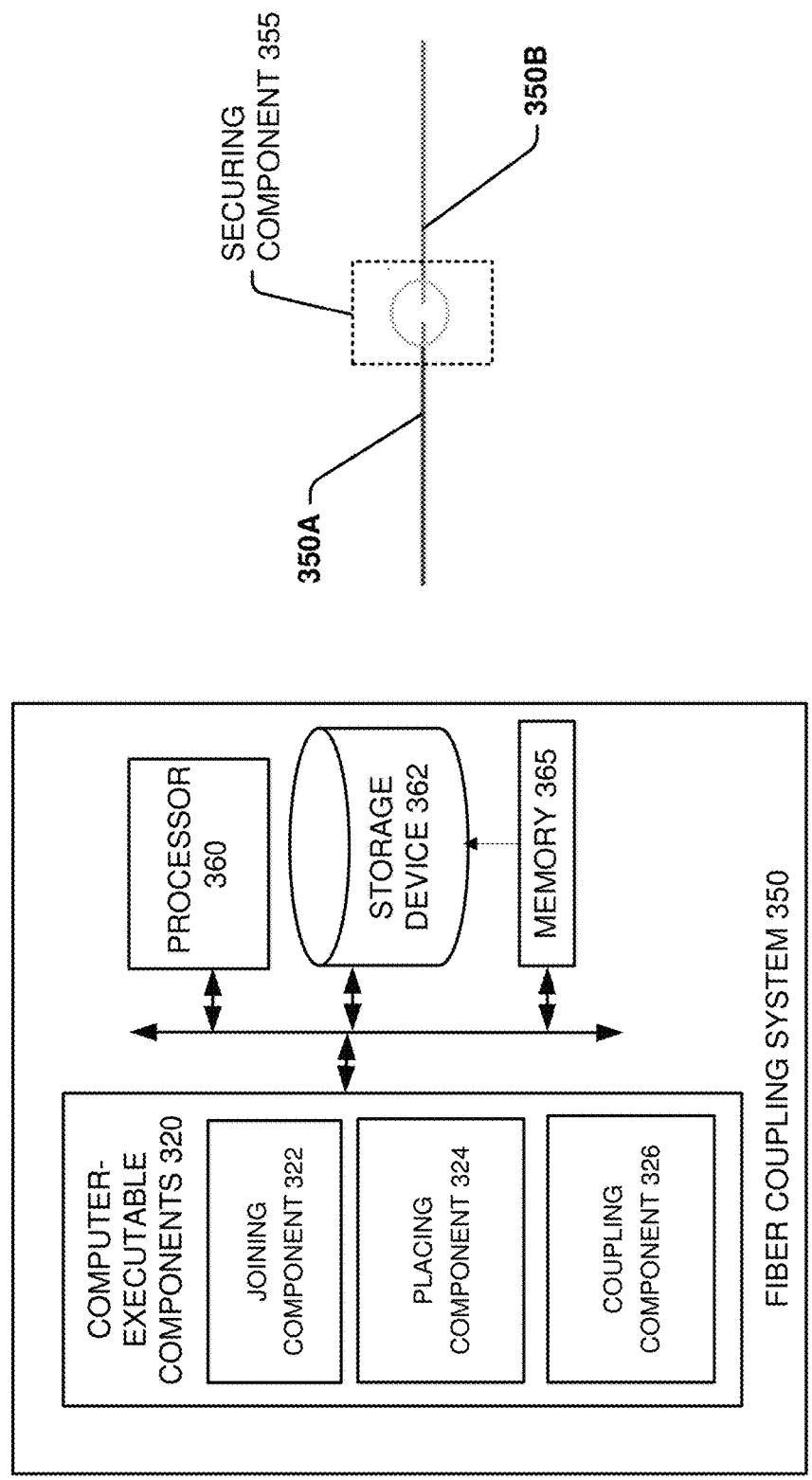
FIG. 3 is an architecture diagram of an example system that can facilitate coupling fiber optic strands by aligning the ends of the fiber optic strands, in accordance with one or more embodiments.

FIG. 3 is an architecture diagram of an example system 300 that can facilitate coupling fiber optic strands by aligning the ends of the fiber optic strands, in accordance with one or more embodiments. For purposes of brevity, description of like elements and/or processes employed in other embodiments is omitted. As depicted, system 300 includes fiber coupling system 350.

fiber coupling system 350 can include computer executable components 320, processor 360, storage device 362 and memory 365. Computer executable components 320 can include joining component 322, placing component 324, securing component 326, and other components described or suggested by different embodiments described herein, that can improve the operation of system 300.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, fiber coupling system 350 can further comprise various computer and/or computing-based elements described herein with reference operating environment 1000 of FIG. 10.

In some embodiments, memory 365 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 365 are described below with reference to system memory 1006 and FIG. 10. Such examples of memory 365 can be employed to implement any embodiments of the subject disclosure.

According to multiple embodiments, storage device 362 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 360 can comprise one or more processors and/or electronic circuitry that can implement one or more computer and/or machine readable, writable, and/or executable components and/or instructions that can be stored on memory 365. For example, processor 360 can perform various operations that can be specified by such computer and/or machine readable, writable, and/or executable components and/or instructions including, but not limited to, logic, control, input/output (I/O), arithmetic, and/or the like. In some embodiments, processor 360 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 360 are described below with reference to processing unit 1004 of FIG. 10. Such examples of processor 360 can be employed to implement any embodiments of the subject disclosure.

Figure 5:
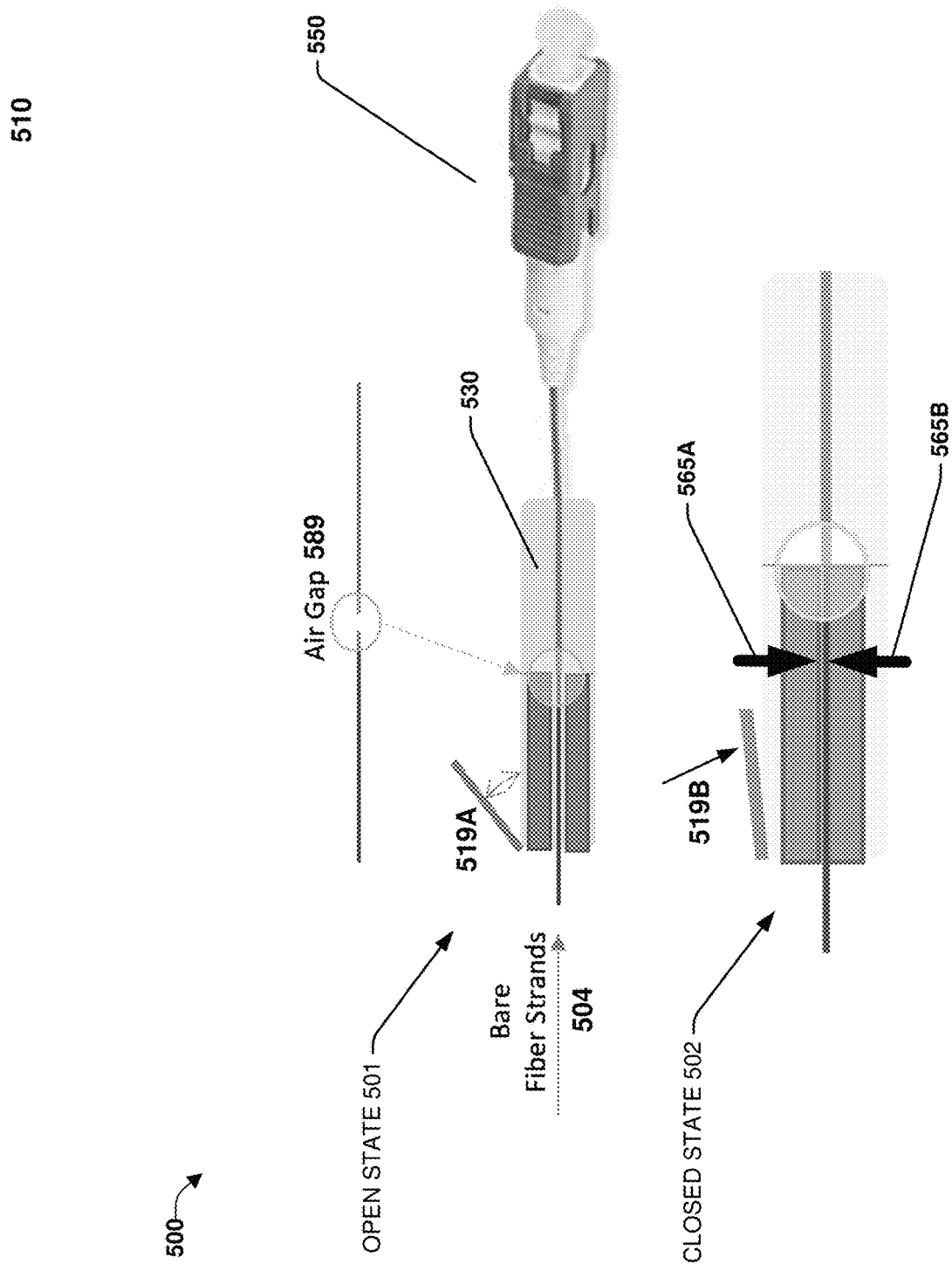
FIG. 5 is a diagram that depicts a non-limiting example operation of a system that can facilitate coupling fiber optic strands by aligning the ends of the fiber optic strands, in accordance with one or more embodiments.
Figure 6:
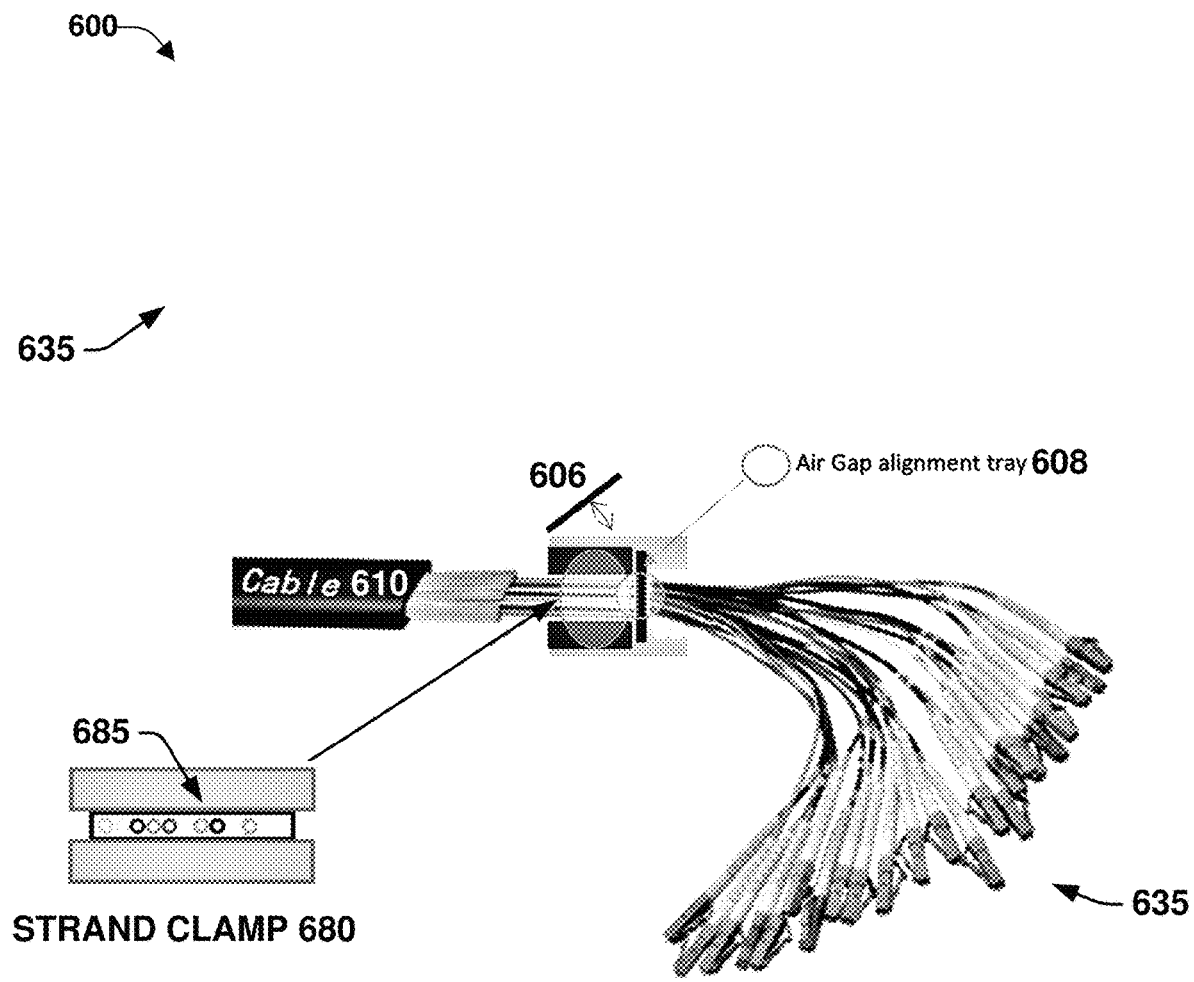
FIG. 6 is a diagram of a non-limiting example system that provides a more detailed, top view of some elements of different implementations of the system described in FIG. 5.

In one or more embodiments, computer executable components 320 can be used in connection with implementing one or more of the systems, devices, components, and/or computer-implemented operations shown and described in connection with FIG. 3 or other figures disclosed herein. For example, in one or more embodiments, computer executable components 320 can include instructions that, when executed by processor 360, can facilitate performance of operations defining joining component 322. As discussed with different examples below, to utilize different components described herein (e.g., as depicted in FIGS. 5-6 below) joining component 322 can, in accordance with one or more embodiments, join opposing members that can be spaced apart to receive bare ended first fiber optic strand 350A into a fiber optic securing component 355 (also termed a "fiber optic securing clip" for some implementations).

Further, in one or more embodiments, computer executable components 320 can include instructions that, when executed by processor 360, can facilitate performance of operations defining placing component 324. As discussed with different examples below, to operate different components described herein (e.g., as depicted in FIGS. 5-6 below) placing component 324 can, in accordance with one or more embodiments, place second fiber optic strand 350B in relation to the opposing members of fiber optic securing component 355 to cause an alignment of the bare ended first fiber optic strand 350A in relation to second fiber optic strand 350B, such alignment facilitating the operation of securing component 326, discussed below.

To facilitate performance of operations for one or more embodiments, securing component 326 can, based on a change of the opposing members to be in a securing position (also termed a 'closed position' herein), secure first fiber optic strand 350A in alignment with second fiber optic strand 350B within securing component 355, e.g., to facilitate optically coupling fiber optic strand 350A in alignment with second fiber optic strand 350B.

Figure 4:
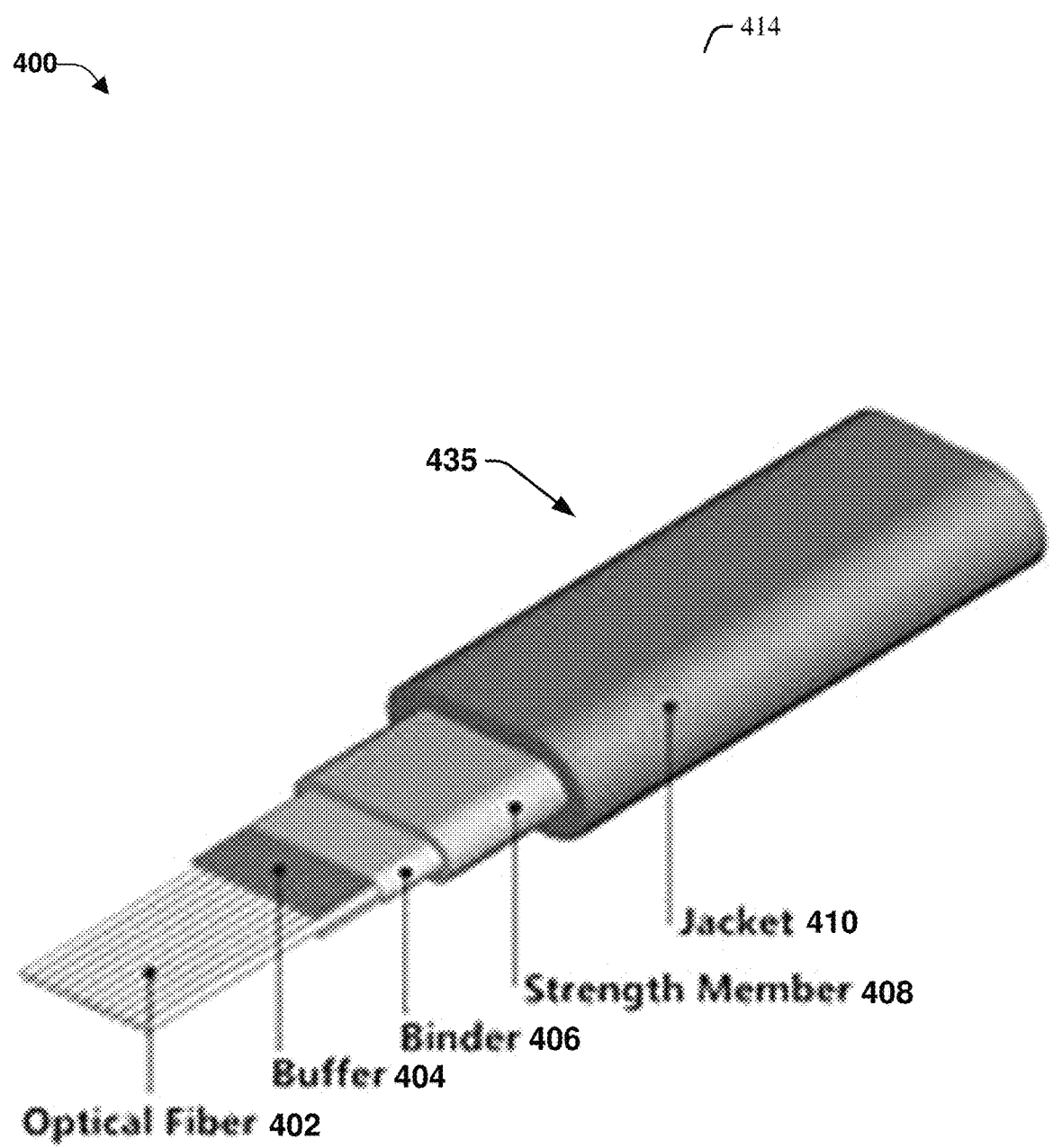
FIG. 4 depicts an additional non-limiting example of a different fiber optic implementation that can facilitate one or more approaches described herein.

FIG. 4 depicts an additional non-limiting example of a different fiber optic implementation 400 that can facilitate one or more approaches described herein. For purposes of brevity, description of some details described with different embodiments herein are omitted. As depicted, implementation 400 includes optical fiber 402, encased as depicted by buffer 404, binder 406, strength member 408, and jacket 410. It is appreciated by one having skill in the relevant art(s), given the description herein, that implementation 400 can be termed a 'fiber ribbon,' and as discussed further below, one or more embodiments can be formed to accommodate the arrangement of optical fiber 402.

FIG. 5 is a diagram that depicts a non-limiting example operation of a system 500 that can facilitate coupling fiber optic strands by aligning the ends of the fiber optic strands, in accordance with one or more embodiments. For purposes of brevity, description of like elements and/or processes employed in other embodiments is omitted. As depicted, system 500 includes a side view of an implementation of one or more embodiments in a first ('open') state 501, with components and functions similar to securing component 355 discussed above. To illustrate operation of system 500, FIG. 5 further includes a magnified side view that depicts the implementation in second ('closed') state 502.

One way of describing the embodiments depicted in FIG. 5 is that system 500 includes a temporary slip coupler 530 (e.g., similar to securing component 355) that can temporarily receive the bare ended fiber strand 504, e.g., with a clamp in an open position 519A. Once received, the clamp can be moved to a closed position 519B, thereby bringing bare ended fiber strand 504 into a precise alignment (e.g., to a selected threshold of alignment accuracy) with another optical strand (e.g., by placing component 324 or other mechanical approach) that can be a part of slip coupler 530. As depicted, one approach to establishing this alignment is by the operation of opposing members 565A-B.

Based at least on the alignment, one or more embodiments can facilitate an optical connection between bare ended fiber strand 504 and the other optical strand while maintaining air gap 589 between the strands, e.g., the air gap distance being maintained to a selected threshold level of accuracy. Once completed, closed state 502 could be reverted to open state 501 by changing the clamp to the open position 519A, thereby releasing bare ended fiber strand 504.

One having skill in the relevant art(s), given the description herein, appreciates that this approach can have advantages over other approaches (e.g., fusion or mechanical splicing of fiber strands) for many applications, including but not limited to, testing the fiber strands. That is, one or more embodiments can use raw fiber slip coupler connector 550 to accelerate testing and characterization processes for fiber optic strands in many different contexts, e.g., by fiber optic diagnostic equipment. One or more embodiments can improve the speed of fiber fault location because fiber connectors do not have to be spliced or otherwise connected to strands before testing.

FIG. 6 is a diagram of a non-limiting example system 600 that provides a more detailed, top view of some elements of different implementations of system 500 described above. For purposes of brevity, description of like elements and/or processes employed in other embodiments is omitted.

System 600 includes cable 610, being held by strand clamp 680. It should be noted that, as depicted, cable 610 can be an example of implementation 400 discussed above, e.g., a fiber optic ribbon cable. System 600 further includes clamp operator 606 being movable to an open state 501 or closed state 502, described with FIG. 5 above. It should be noted that the top view of FIG. 6 illustrates the arrangement 685 of optical fiber 402 (e.g., in the ribbon cable of FIG. 4) within strand clamp 680.

FIG. 6 also provides additional detail regarding the implementation of air gap 589 of FIG. 5. As depicted, strand clamp 680 interfaces with air gap alignment tray 608 to precisely align the optical strands of cable 610 with output strands 635 affixed to strand clamp 680, in accordance with one or more embodiments.

FIG. 7 illustrates an example method 700 that can facilitate coupling fiber optic strands by aligning the ends of the fiber optic strands, in accordance with one or more embodiments. For purposes of brevity, description of like elements and/or processes employed in other embodiments is omitted.

At 702, method 700 can include moving opposing members of a fiber optic securing clip from an open position to a closed position, wherein the opposing members are spaced apart to receive a first fiber optic strand comprising a bare end. At 704, method 700 can include, based on the opposing members being in the closed position, securing the bare end of the first fiber optic strand within the fiber optic securing clip comprising optically coupling the first fiber optic strand to an end of a second fiber optic strand.

In one or more embodiments, method 700 can further include moving the opposing members from the closed position to the open position, and based on the opposing members being in the open position, releasing the bare end of the first fiber optic strand from being secured within the fiber optic securing clip. In one or more embodiments, method 700 can further include moving the opposing members from the open position to the closed position, and based on the opposing members being in the closed position, securing a second bare end of a third fiber optic strand within the fiber optic securing clip comprising optically coupling the third fiber optic strand to the end of the second fiber optic strand.

FIG. 8 illustrates an example method 800 that can facilitate coupling fiber optic strands by aligning the ends of the fiber optic strands, in accordance with one or more embodiments. For purposes of brevity, description of like elements and/or processes employed in other embodiments is omitted.

At 802, method 800 can include receiving a bare end of a first fiber optic strand by securing members of a fiber optic diagnostic clip, resulting in a received first fiber optic strand. At 804, method 800 can further include communicating a light signal from the first fiber optic strand to a second fiber optic strand via an optical coupling of the first fiber optic strand to the second fiber optic strand, wherein the optical coupling is facilitated by the securing members securing the received first fiber optic strand within the fiber optic diagnostic clip, as a result of which the bare end of the first fiber optic strand is communicatively aligned with a coupling end of the second fiber optic strand.

Figure 9:
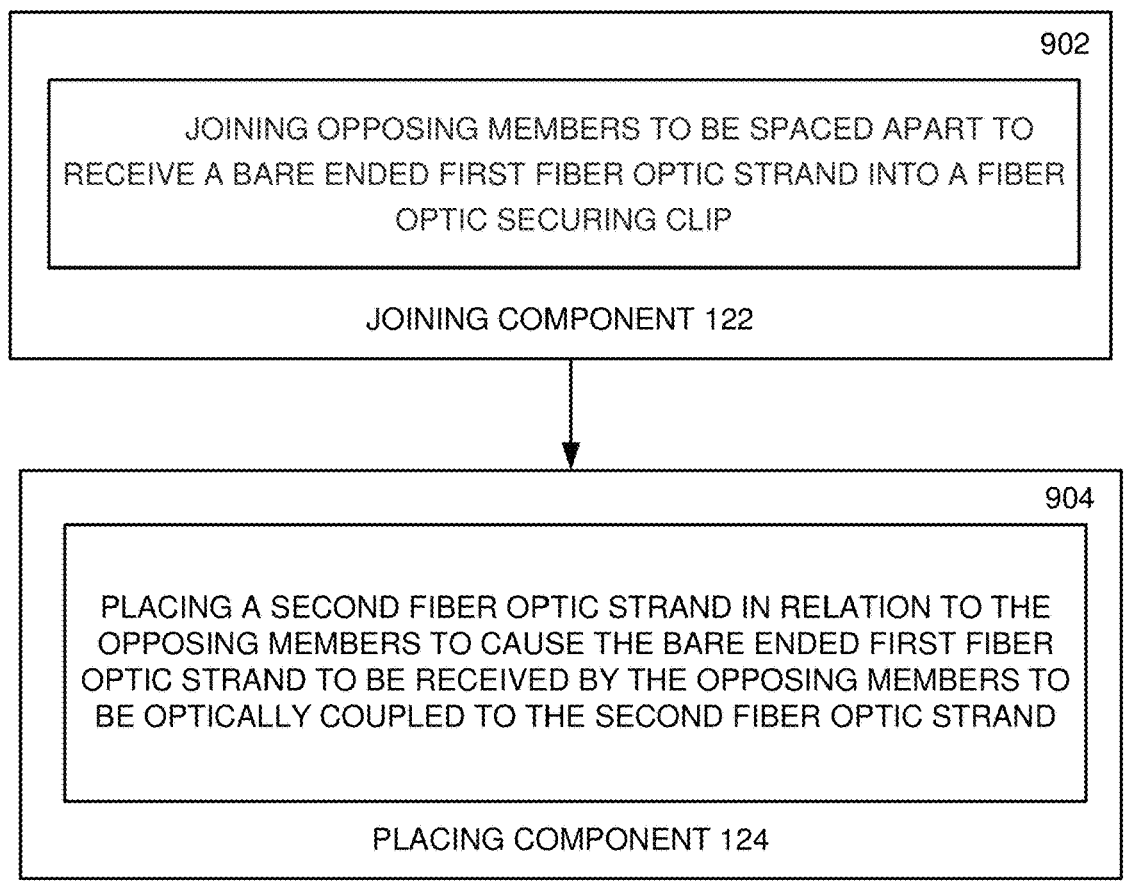
FIG. 9 depicts a system that can facilitate coupling fiber optic strands by aligning the ends of the fiber optic strands, in accordance with one or more embodiments.

FIG. 9 depicts a system 900 that can facilitate coupling fiber optic strands by aligning the ends of the fiber optic strands, in accordance with one or more embodiments. For purposes of brevity, description of like elements and/or processes employed in other embodiments is omitted. As depicted, system 900 can include joining component 122, placing component 126, and other components described or suggested by different embodiments described herein, that can improve the operation of system 900.

In an example, component 902 can include the functions of joining component 122, supported by the other layers of system 900. For example, component 902 can join opposing members to be spaced apart to receive a bare ended first fiber optic strand into a fiber optic securing clip. In an example, component 904 can include the functions of placing component 124, supported by the other layers of system 900. For example, component 904 can join opposing members to be spaced apart to receive a bare ended first fiber optic strand into a fiber optic securing clip.

Figure 10:
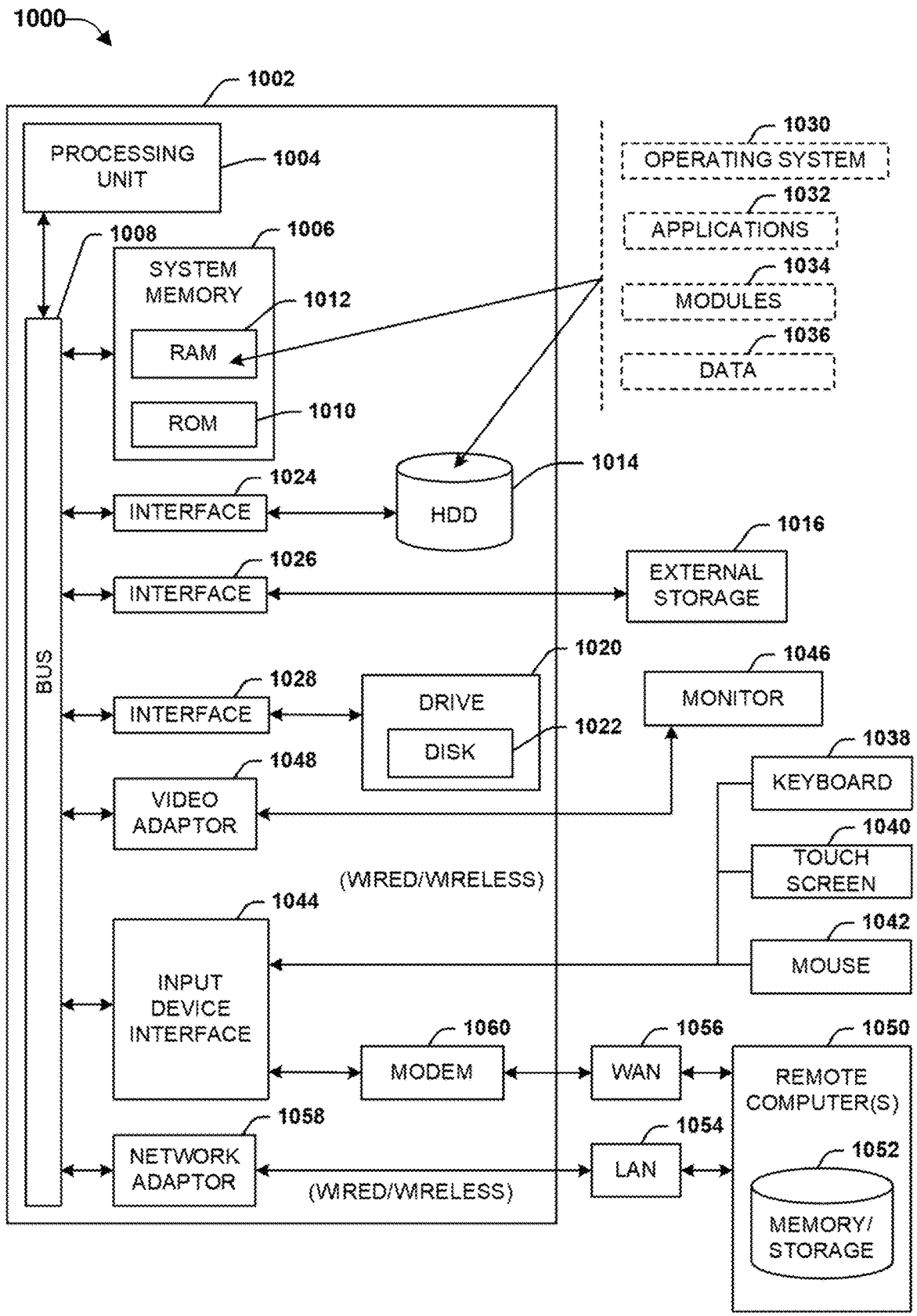
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    moving opposing members of a fiber optic securing clip from an open position to a closed position, wherein the opposing members are spaced apart to receive a first fiber optic strand comprising a bare end; and
    based on the opposing members being in the closed position, securing the bare end of the first fiber optic strand within the fiber optic securing clip comprising optically coupling the first fiber optic strand to an end of a second fiber optic strand, wherein securing the bare end of the first fiber optic strand comprises securing the bare end of the first fiber optic strand to the end of the second fiber optic strand with a selected gap of space separating the bare end of the first fiber optic strand from the end of the second fiber optic strand, and wherein the securing occurs without permanently joining the first fiber optic strand and the second fiber optic strand.

2. The method of claim 1, further comprising:
    moving the opposing members from the closed position to the open position; and
    based on the opposing members being in the open position, releasing the bare end of the first fiber optic strand from being secured within the fiber optic securing clip.

3. The method of claim 2, wherein the bare end of the first fiber optic strand comprises a first bare end, and wherein the method further comprises:
    moving the opposing members from the open position to the closed position; and
    based on the opposing members being in the closed position, securing a second bare end of a third fiber optic strand within the fiber optic securing clip comprising optically coupling the third fiber optic strand to the end of the second fiber optic strand.

4. The method of claim 1, wherein the second fiber optic strand is coupled to fiber optic diagnostic equipment.

5. The method of claim 1, wherein securing the bare end of the first fiber optic strand comprises aligning the bare end of the first fiber optic strand with the end of the second fiber optic strand, and wherein the bare end of the first fiber optic strand and the end of the second fiber optic strand are aligned to a first threshold of alignment accuracy.

6. The method of claim 1, wherein the selected gap of space is maintained to a second threshold of accuracy.

7. The method of claim 1, wherein the first fiber optic strand is comprised in a first group of bare ended fiber optic strands, wherein the second fiber optic strand is comprised in a second group of fiber optic strands, and wherein the method further comprises, based further on the opposing members being in the closed position, respectively securing ones of the first group of bare ended fiber optic strands to the second group of fiber optic strands.

8. The method of claim 7, wherein the first group of bare ended fiber optic strands is connected into a fiber optic ribbon cable comprising a group of fiber optic strands comprising respective bare ends.

9. The method of claim 1, wherein securing the bare end of the first fiber optic strand within the fiber optic securing clip comprises releasably securing the bare end of the first fiber optic strand within the fiber optic securing clip.

10. A method, comprising:
    receiving a bare end of a first fiber optic strand by securing members of a fiber optic diagnostic clip, resulting in a received first fiber optic strand; and
    communicating a light signal from the first fiber optic strand to a second fiber optic strand via an optical coupling of the first fiber optic strand to the second fiber optic strand, wherein the optical coupling is facilitated by the securing members securing the received first fiber optic strand within the fiber optic diagnostic clip, as a result of which the bare end of the first fiber optic strand is communicatively aligned with a coupling end of the second fiber optic strand,
    wherein the optical coupling comprises securing the bare end of the first fiber optic strand to the coupling end of the second fiber optic strand with a selected gap of space separating the bare end of the first fiber optic strand from the coupling end of the second fiber optic strand, and wherein the securing of the bare end of the first fiber optic strand to the coupling end of the second fiber optic strand occurs without permanently joining the first fiber optic strand and the second fiber optic strand.

11. The method of claim 10, further comprising:
    detaching the first fiber optic strand from the fiber optic diagnostic clip comprising changing an orientation of the securing members to release the first fiber optic strand.

12. The method of claim 11, wherein changing the orientation of the securing members comprises physically changing the orientation of the securing members to release the first fiber optic strand.

13. The method of claim 10, wherein the securing members releasably secure the first fiber optic strand within the fiber optic diagnostic clip.

14. The method of claim 10, wherein the second fiber optic strand is coupled to fiber optic diagnostic equipment.

15. The method of claim 10, wherein the optical coupling comprises communicatively aligning the bare end of the first fiber optic strand with the coupling end of the second fiber optic strand to a first threshold of alignment accuracy.

16. A system, comprising:
a processor; and
a memory that stores executable instructions that, when executed by the processor, facilitate performance of operations, comprising:
joining opposing members to be spaced apart to receive a bare ended first fiber optic strand into a fiber optic securing clip, and
placing a second fiber optic strand in relation to the opposing members to cause the bare ended first fiber optic strand to be received by the opposing members to be optically coupled to the second fiber optic strand,
wherein the optical coupling comprises securing the bare end of the first fiber optic strand to a coupling end of the second fiber optic strand with a selected gap of space separating the bare end of the first fiber optic strand from the coupling end of the second fiber optic strand, and wherein the securing of the bare end of the first fiber optic strand to the coupling end of the second fiber optic strand occurs without permanently joining the first fiber optic strand and the second fiber optic strand.

17. The system of claim 16, wherein joining the opposing members comprises movably joining the opposing members to be movable between a first position and a second position, wherein, in the first position, the opposing members are oriented to receive the bare ended first fiber optic strand, and wherein in the second position, the opposing members are oriented to secure the bare ended first fiber optic strand in a secured position within the fiber optic securing clip.

18. The system of claim 17, wherein the bare ended first fiber optic strand and the second fiber optic strand are caused to be optically coupled based on the secured position of the bare ended first fiber optic strand being positioned in relation to the second fiber optic strand.

19. The system of claim 18, wherein the secured position comprises a position that aligns the bare ended first fiber optic strand to facilitate optical transmission of a signal to the second fiber optic strand.

20. The system of claim 16, wherein the optical coupling comprises communicatively aligning the bare end of the first fiber optic strand with the coupling end of the second fiber optic strand to a first threshold of alignment accuracy.

* * * * *